R. R. REED.
BALANCING DEVICE.
APPLICATION FILED JAN. 11, 1909.

955,435.

Patented Apr. 19, 1910.

Witnesses:
Gertrude Reed
H. A. Stegman

Inventor:
Ralph P. Reed.

UNITED STATES PATENT OFFICE.

RALPH R. REED, OF OAKLAND, CALIFORNIA.

BALANCING DEVICE.

955,435.     Specification of Letters Patent.     Patented Apr. 19, 1910.

Application filed January 11, 1909. Serial No. 471,767.

*To all whom it may concern:*

Be it known that I, RALPH R. REED, a citizen of the United States, residing at Oakland, in the county of Alameda and State of California, have invented certain new and useful Improvements in Balancing Devices; and I do declare the following to be a full, clear, and exact description of the invention, such as will enable others skilled in the art to which it appertains to make and use the same.

This invention relates to improvements in balancing devices.

The object of the invention is to provide a device of this character having means whereby a centrally disposed object or figure can remain suspended or in equilibrium unaffected by the rotary motion of a hollow transparent ball surrounding said object or figure; the said ball allowing an easy view of said object or figure from all points of observation, and particularly a freedom of motion in any direction when rolled on a plane surface or otherwise revolved, thereby exhibiting to the best advantage the absolute equilibrium of the central object.

A further object is to provide a device which will amuse children by exhibiting the phenomena or spectacle of a centrally disposed object or figure, within a hollow, transparent ball, remaining in equilibrium, unaffected by any revolving motion of said ball.

With the above and other objects in view, the invention consists of the novel features of construction, combination, and arrangements of parts as will be hereinafter described and claimed.

Figure 1:
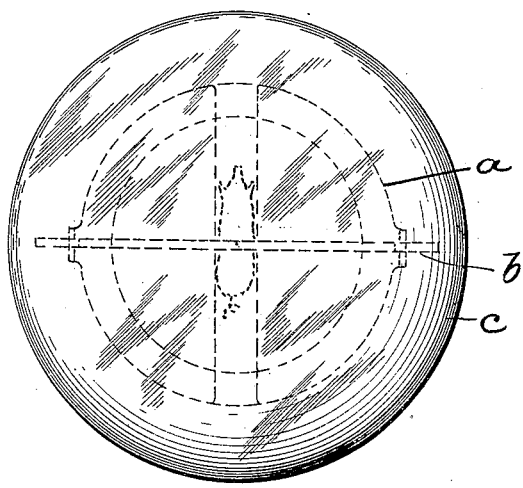
Figure 2:
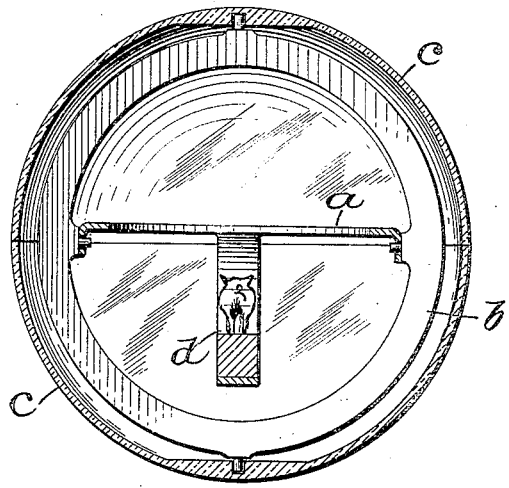

In the accompanying drawings: Figure 1 is a top view of a set of gimbals or rings, "$a$" and "$b$", similar to those of a ship's compass, the outer ring being pivoted to the inner wall of a hollow transparent ball "$c$" Fig. 2. The principle of the gimbal is well known, and needs no further illustration. The weight of the figure at "$d$" serves as ballast, (other weight may be added, if needed) to keep the central ring in equilibrium, unaffected by the revolving motion of the outer ring "$b$", or the ball to which it is attached. The ball "$c$" is made by joining with cement, the edges of two hollow, transparent sections or hemi-spheres.

Having thus described my invention, what I claim as new, and desire to secure by Letters Patent is:

A hollow, transparent ball, a set of gimbal rings pivoted to and within said ball; a weighted figure mounted on the inner ring, and having its center of gravity below the center of the sphere and capable of remaining in equilibrium regardless of any revolving motion of said ball.

In testimony whereof I have hereunto set my hand in the presence of two subscribing witnesses.

RALPH R. REED.

Witnesses:
   ALENA BAILEY,
   THOS. TAYLOR.